US011959514B2

(12) United States Patent
Rudolph

(10) Patent No.: US 11,959,514 B2
(45) Date of Patent: Apr. 16, 2024

(54) HYDRODYNAMIC SLIDING BEARING

(71) Applicant: Voith Patent GmbH, Heidenheim (DE)

(72) Inventor: Ralph Rudolph, Isny (DE)

(73) Assignee: Voith Patent GmbH, Heidenheim (DE)

( * ) Notice: Subject to any disclaimer, the term of this patent is extended or adjusted under 35 U.S.C. 154(b) by 222 days.

(21) Appl. No.: 17/353,197

(22) Filed: Jun. 21, 2021

(65) Prior Publication Data

US 2021/0310514 A1 Oct. 7, 2021

Related U.S. Application Data

(63) Continuation of application No. PCT/EP2019/084334, filed on Dec. 10, 2019.

(51) Int. Cl.
F16C 17/02 (2006.01)
(52) U.S. Cl.
CPC .................... *F16C 17/028* (2013.01)
(58) Field of Classification Search
CPC .................................................. F16C 17/028
See application file for complete search history.

(56) References Cited

U.S. PATENT DOCUMENTS

| 3,132,906 A * | 5/1964 | Sternlicht ............. F16C 17/028 384/114 |
| 3,201,183 A | 8/1965 | Buske |
| 10,197,095 B2 | 2/2019 | Althaus et al. |
| 2016/0333929 A1* | 11/2016 | Althaus ............... F16C 32/0659 |

FOREIGN PATENT DOCUMENTS

| DE | 10 2008 045 168 A1 | 5/2009 |
| EP | 3 094 873 B1 | 3/2019 |
| RU | 2 013 672 C1 | 5/1994 |
| WO | WO-2008061944 A1 * | 5/2008 ........... F01D 25/166 |
| WO | 2015/107048 A2 | 7/2015 |

OTHER PUBLICATIONS

Machine Translation of WO-2008061944-A1 (Year: 2008).*
German Office Action dated Jul. 24, 2019 for German Application No. 10 2018 133 279.3 (12 pages).
Notification of the Transmission of the International Search Report and Written Opinion of the International Search Authority or Declaration dated Feb. 13, 2020 for International Application No. PCT/EP2019/084334 (12 pages).

* cited by examiner

*Primary Examiner* — Alan B Waits
(74) *Attorney, Agent, or Firm* — Taylor IP, P.C.

(57) ABSTRACT

A hydrodynamic sliding bearing, including: a housing shell including an inner surface which forms a bearing surface configured for a rotating shaft having a radius, the housing shell including a center point, the bearing surface including at least two surface sections which are arranged one behind the other in a circumferential direction of the bearing shell, the at least two surface sections including at least one first surface section and at least one second surface section, the at least one second surface section forming a load segment, the at least one first surface section forming a non-load segment, the at least two surface sections each configured for being inscribed thereinto in an axial section with a respective circle, the respective circle of each of the at least two surface sections each having a radius that is larger than the radius of the rotating shaft and each having a center point each of which exhibits a respective eccentricity relative to the center point of the housing shell, the eccentricity of the load segment being greater than the eccentricity of the non-load segment.

27 Claims, 5 Drawing Sheets

HYDRODYNAMIC SLIDING BEARING

CROSS REFERENCE TO RELATED APPLICATIONS

This is a continuation of PCT application No. PCT/EP2019/084334, entitled "HYDRODYNAMIC SLIDING BEARING", filed Dec. 10, 2019, which is incorporated herein by reference.

BACKGROUND OF THE INVENTION

1. Field of the Invention

The present invention relates to bearings, and, more particularly, to hydrodynamic sliding bearings.

2. Description of the Related Art

The present invention relates to a hydrodynamic sliding bearing having a housing shell, the inner surface of which forms a bearing surface for a rotating shaft, wherein the bearing surface has at least two surface sections which are arranged one behind the other in circumferential direction of the bearing shell.

Such bearings are described as multi surface bearings wherein the individual surface sections in each case create a wedge gap (multi-wedge bore) and thus, respectively also a pressure build up in a lubricating oil, so that different stationary and dynamic operating characteristics of a bearing are predictable. A hydrodynamic sliding bearing is known for example from the international patent application WO 2015/107048 A2. In addition to excellent dynamic characteristics, said sliding bearing is also characterized by good bearing damping and good heat management. However, it has turned out that a bearing executed according to this application exhibits rather a high oil consumption and an accordingly high power loss.

What is needed in the art is an improved hydrodynamic sliding bearing having a lower oil consumption and lower power loss, without creating increased bearing temperatures.

SUMMARY OF THE INVENTION

To solve the task, the present invention provides a hydrodynamic sliding bearing which has a housing shell, the inner surface of which forms a bearing surface for a rotating shaft. To form a bearing with multi-wedge bore, the bearing surface has at least two surface sections which are arranged one behind the other in circumferential direction of the bearing shell, wherein at least one surface section forms one load segment and at least one surface section forms a non-load segment. A circle can be inscribed in an axial section into each of the at least two surface sections, said circle having a larger radius than the radius of the rotating shaft. Moreover, the center points of the at least two inscribable circles exhibit an eccentricity relative to the center point of the bearing shell, wherein the eccentricity of the load segment is greater than the eccentricity of the non-load segment.

The hydrodynamic gliding bearing has a bearing shell which on its inside surface forms a bearing surface for a rotating shaft which is supported in the sliding bearing. In the sense of the present application, a shaft is understood to be any torque transmitting component, in particular of a machine assembly, which is cylindrical at least in sections in the area of the bearing and rotates about the center line. The bearing surface arranged at the inside circumference of the bearing shell of the sliding bearing has at least two surface sections which are arranged one behind the other in circumferential direction which form a wedge gap, in particular due to a radial offset at their transition, and thus form a bearing with a multiple wedge bore. At least one such surface section forms a load segment which is intended to receive larger bearing forces, and at least one surface section forms a non-load segment, upon which usually no or smaller bearing forces act. Between the outer circumferential surface of the rotating or rotatable shaft and the surface sections forming the inside circumferential surface of the sliding bearing, a hydrodynamic lubricating film of oil is formed during rotation of the shaft if a suitable oil supply is available.

In the proposed design of the hydrodynamic sliding bearing, in an axial section arranged perpendicular to the bearing axis, a circle can be inscribed in each of the at least two surface sections, said circle having a larger radius than the radius of the rotating shaft. Correspondingly, such a surface section has an overall convex shape in the axial section, which in particular is at least approximately circular or circular arc-shaped. In particular, due to the fact that in the axial section a circle which can be inscribed in a surface section has a larger radius than the radius of the rotating shaft, the surface section is suitable to support the rotating shaft in bearings, in particular by creating a suitable lubricating film in the thereby resulting bearing gap.

The center points of the at least two inscribable circles each have an eccentricity e relative to the center point of the bearing shell; in other words, the center points of the inscribable circles have a distance equal to the eccentricity from the center point of the bearing shell. Due to the resulting offset of the center points of circles which can be inscribed into the surface sections, a bearing surface results in the form of a multi-wedge bore. In the proposed design, the eccentricity of the load segment is greater than the eccentricity of the non-load segment. This enables a different bearing behavior to be set in the individual segments, in particular in regard to the bearing capacity of load and non-load segment. Moreover, a bearing geometry with low oil consumption results thereby, which in addition facilitates sufficient damping of the supported shaft.

The load segment is understood to be in particular the segment which absorbs greater forces during operation.

The proposed hydrodynamic sliding bearing thus provides for a lower oil consumption and a lower power loss, without significantly increasing the bearing temperatures. The proposed arrangement in addition provides sufficient damping of the bearing in load-free operation of the rotating shaft as well as during full-load operation.

In one embodiment of the hydrodynamic sliding bearing the difference between the eccentricities is between 10% and 70%. Due to this large range of possible eccentricities surface sections having different bearing behaviors can be provided in particular at different positions of a hydrodynamic sliding bearing.

In one embodiment of the hydrodynamic sliding bearing, the center points of the circles which can be inscribed into the at least two surface sections are arranged in an offset plane progressing through the center point of the bearing shell. Each eccentricity corresponds to the distance of the center point of an inscribable circle to the center point of the bearing in the offset plane.

In particular, in bearing arrangements wherein two surface sections are arranged opposite one another, a design is advantageous wherein the center points of the inscribable circles are arranged on different sides of the bearing center point on the offset plane.

In one embodiment of the hydrodynamic sliding bearing, at least two surface sections adjoin an offset that is arranged between them. Due to different eccentricities of the surface sections, a radial offset, for example in the form of a step, can occur between the bearing surfaces formed by the surface sections at the circumferential position at which the surface sections adjoin one another. Such an offset forms a wedge gap in the bearing surface of the hydrodynamic sliding bearing.

In one embodiment of the hydrodynamic sliding bearing, at least one oil supply pocket is arranged at the bearing surface at a pocket angle in the direction of rotation of the shaft after the offset. Because the at least one oil supply pocket is arranged in the direction of rotation of the shaft after the offset, oil is available to the rotating shaft to form an oil film in the sliding bearing. In the proposed embodiment, the pocket angle is advantageously between 0° and 40°. The angle measurement, here as well as in the following angle specifications, is stated in degrees, which represents the 360th part of the full angle.

The arrangement of an oil supply pocket with a pocket angle between 0° and 40° in the direction of rotation of the shaft after an offset, as proposed for this embodiment, enables a good oil supply in particular to the surface section which adjoins the oil supply pocket in the direction of rotation of the shaft. Due to the proposed position of the oil supply pocket, a suitable lubricating film with appropriate dynamic and static properties can build up in this surface section. Moreover, optimum utilization of the used lubricating oil is achieved due to the proposed design.

In one embodiment of the hydrodynamic sliding bearing, the pocket angle at which a first oil supply pocket is arranged in the direction of rotation of the shaft after a first offset is independent of the pocket angle at which a second oil supply pocket is arranged in the direction of rotation of the shaft after a second offset. Accordingly, the pocket angle can be designed specifically for the limiting conditions relevant in the present surface section, irrespective of the limiting conditions present in other surface sections.

The pocket angle is defined in the direction of rotation as the angle between the offset point plane and the center of the oil supply pocket.

According to an especially advantageous embodiment, the pocket angle of the load segment is in the range of between 20° and 30°, or between 20° and 25° after offset point plane. The pocket angle of the non-load segment can be in the range of 30° to 35° after offset point plane.

The special combination of the 6 parameters in load segment and non-load segment which in each case describe the pocket position angle, the width of the oil pocket and the pocket angle results in a bearing which, compared to a non-optimized offset bearing as known for example from EP3094873 has a substantially lower power loss and a greatly reduced oil consumption.

In one embodiment of the hydrodynamic sliding bearing each oil supply pocket is connected with an oil bore to supply the sliding bearing with oil. In the context of the present invention, the term oil bore is understood to mean any single- or multi-part orifice which leads to the oil supply pocket, and which has a suitable cross-section for supplying the oil supply pocket with oil. The cross section of the oil bore of an oil supply pocket of a sliding bearing with a larger nominal diameter is therein normally larger—particularly due to the greater oil requirement of the larger bearing surface—than the cross section of the oil bore of an oil supply pocket of a sliding bearing having a smaller nominal diameter of the bearing.

In a first embodiment of the hydrodynamic sliding bearing, the first opening angle which describes in particular the size of the opening of a first oil supply pocket along the bearing surface, is independent from a second opening angle which describes in particular the size of the opening of a second oil supply pocket along the bearing surface. Accordingly, the opening angle of an oil supply pocket can be designed specifically for the limiting conditions relevant in the present surface section, irrespective of the limiting conditions present in other surface sections. In an additional advantageous embodiment the opening angle of an oil supply pocket is between 10° and 30° and especially between 12° and 22°.

In one advantageous arrangement, the opening angle of the oil supply pocket is larger on the load segment than on the non-load segment. Herein, the opening angle—which in particular describes the size of the opening of the oil supply pocket along the bearing surface—for the oil supply pocket on the load segment is for example between 15° and 20°, and on the non-load segment between 14° and 18°.

In one embodiment of the hydrodynamic sliding bearing the width of a first oil supply pocket on the bearing surface is independent of the width of a second oil supply pocket on the bearing surface. The width of an oil supply pocket can thus be designed specifically to the limiting conditions relevant in the current surface section and independent of limiting conditions in other surface sections.

However, in one especially advantageous embodiment, the ratio of the width of the oil supply pocket on the load segment to the width of the bearing is in the range of 0.6 to 0.7, respectively; the ratio of the width of the oil supply pocket on the non-load segment to the width of the bearing is in the range of 0.35 to 0.5, respectively.

Each individual geometric detail results in that, oil only reaches the regions of the bearing where it is imperative for the function of the bearing. Thereby, parts of the lubricating gap, which is defined as the gap between the bearing shell and the shaft, are not filled completely with oil. This results in a lower oil consumption of the bearing and a lower power loss because the areas that are not completely filled have a lower shear of the oil film.

Due to the aforementioned independent variation possibilities in the design of oil supply pockets of the proposed hydrodynamic sliding bearing, these can be designed according to the specific requirements of the respective surface sections.

In one embodiment of the hydrodynamic sliding bearing, two offsets are arranged between surface sections, diametrically opposite to one another in an offset point plane progressing through the center of the bearing shell. This offset point plane is arranged at an offset angle γ relative to the offset plane, which also progresses through the center of the bearing shell and in which the centers of the circles that can be inscribed in the at least two surface sections are arranged. In one advantageous embodiment, offset angle γ between the offset point plane and the offset plane is between 0° and 40°. In another advantageous embodiment, offset angle γ is between 15° and 25°.

One embodiment of the hydrodynamic sliding bearing has a virtual parting line plane which is arranged pivoted at a parting angle θ relative to the offset point plane. In one embodiment, for example, the virtual parting line plane is pivoted about a parting angle θ of 20° relative to the offset point plane, wherein, depending on the design of the proposed hydrodynamic sliding bearing, the size of the parting angle θ can be selected to be greater than or less than 20°.

In one embodiment of the hydrodynamic sliding bearing, the center of the shell is arranged at a central angle c in relation to the virtual parting line plane, which is in particular 90°. The geometry of the sliding bearing with virtual parting line plane and the shell center arranged at a center angle c are determined during the design of the bearing in accordance with the load distribution acting in the intended application and the intended installation position.

In one embodiment of the hydrodynamic sliding bearing, the sliding bearing is intended for a standard load angle φ of between 10° and 25°, and in particular between 5° and 10°, in the direction of rotation of the shaft relative to the center of the shell. For such a standard load case, an advantageous design for a hydrodynamic sliding bearing results from values which were previously proposed as an option for the individual parameter ranges.

In one embodiment of the hydrodynamic sliding bearing the bearing shell has two bearing shell halves, each of which extend over 180° (semicircle) of the bearing surface and are joined at a separating line in a plane of separation. Such a design allows radial insertion of a shaft into a two-part bearing shell.

In one embodiment of the hydrodynamic sliding bearing, the plane of separation is pivoted at a separating line angle δ with respect to the offset plane, the separating line angle δ being between 10° and 80°. In a further advantageous embodiment, the separating line angle δ is between 35° and 45°. In one embodiment of the bearing, the plane of separation corresponds to the virtual parting line plane.

In at least one embodiment of the hydrodynamic sliding bearing the geometry of at least one surface section can be described as a mathematical function. The geometry of at least one surface section can therein be for example a circular arc, an elliptical arc, a hyperbolic arc, a parabolic arc or also a curve segment with a mathematical order of two or higher. Accordingly, the geometry of at least one surface section of the hydrodynamic sliding bearing can be designed on the basis of the specifically intended load distribution on the hydrodynamic sliding bearing.

In one embodiment of the hydrodynamic sliding bearing the at least two surface sections have a different profiling ψv. Profiling ψv is herein defined by the sum of eccentricity e of the respective surface section and the radial bearing clearance Ls, relative to the radial bearing clearance Ls.

$$\psi v = \frac{e + Ls}{Ls}$$

By means of different profiling ψv, the surface sections can be provided with different load-bearing properties. In one embodiment, for example, profiling ψv of the load segment is larger than the profiling of the non-load segment, in particular in order to be able to accommodate greater bearing forces in the load segment.

In one embodiment of the hydrodynamic sliding bearing, profiling ψv of the load segment and also profiling ψv of the non-load segment is in a range of 1 to 3. Surface sections whose profiling is within this range can be designed as load or non-load segments. In one embodiment, profiling ψv of the load segment in which normally higher bearing forces act, is in a range of 1.5 to 1.8. In this, or in other embodiment, profiling ψv of the non-load segment in which normally lower bearing forces act is in a range of 1.2 to 1.5.

Accordingly, it is proposed in one embodiment, to select the profiling of the load segment to be higher than the profiling of the non-load segment.

Due to the effect of one or multiple of the features described above, the proposed bearing offers lower oil consumption as well as lower power loss without resulting in a significant increase in bearing temperatures compared to known bearings. The advantageous design of the bearing also permits sufficient damping of the bearing both when the rotating shaft is running under no load and under full load.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The figures depict two embodiments of exemplary inventive hydrodynamic sliding bearings 1. In particular, the features of sliding bearing 1 are shown in the figures in an exaggerated manner for better understanding and explanation.

Figure 1:
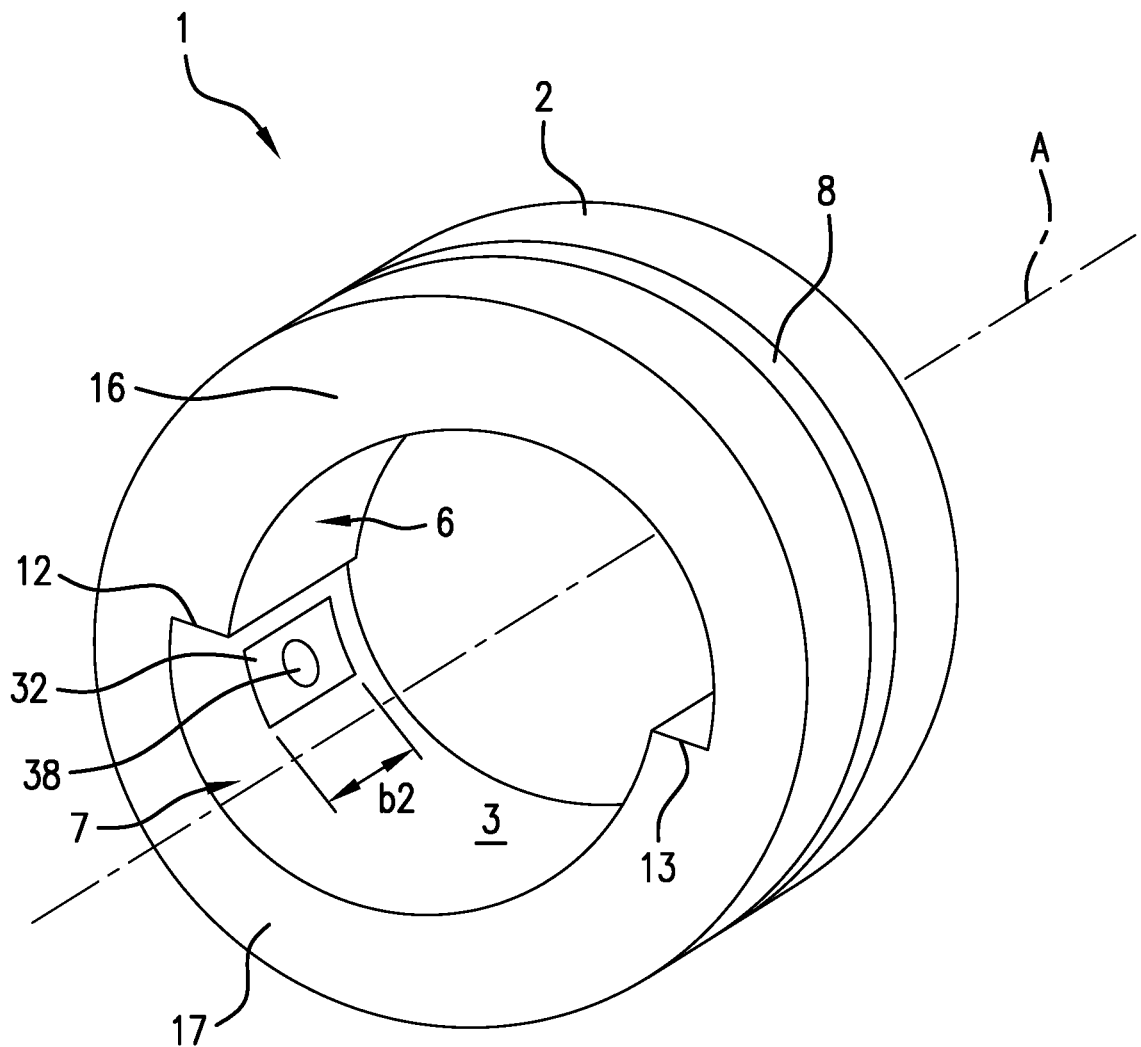
FIG. 1 is a three-dimensional illustration of an exemplary hydrodynamic sliding bearing with features illustrated in an exaggerated manner, in accordance with an exemplary embodiment of the present invention.

FIG. 1 is a three-dimensional illustration of an exemplary inventive hydrodynamic sliding bearing 1 with a bearing shell 2. The inside surface of bearing shell 2 provides a bearing surface 3 for a rotating shaft 5 (shown in FIG. 2). To form a bearing with multi-wedge bore, bearing surface 3 has at least two surface sections 6, 7 which are arranged one behind the other in circumferential direction of bearing shell 1, wherein at least one surface section 7 forms one load segment 17 and at least one surface section 6 forms a non-load segment 16. An oil supply groove 8 is arranged around the outer circumference of bearing shell 2, which is used to supply sliding bearing 1 with lubricating oil.

In surface section 6 an oil supply pocket 32 is also shown, which is connected with an oil bore 38 in order to supply sliding bearing 1 with oil. Oil bore 38 represents a connection between circumferential oil supply groove 8 and oil supply pocket 32. Oil supply pocket 32 in load segment 17 furthermore has a width b2 on bearing surface 3, which is established in particular on the basis of the desired lubricating properties. Additional features of oil supply pocket 32 are described in further detail below.

Figure 2:
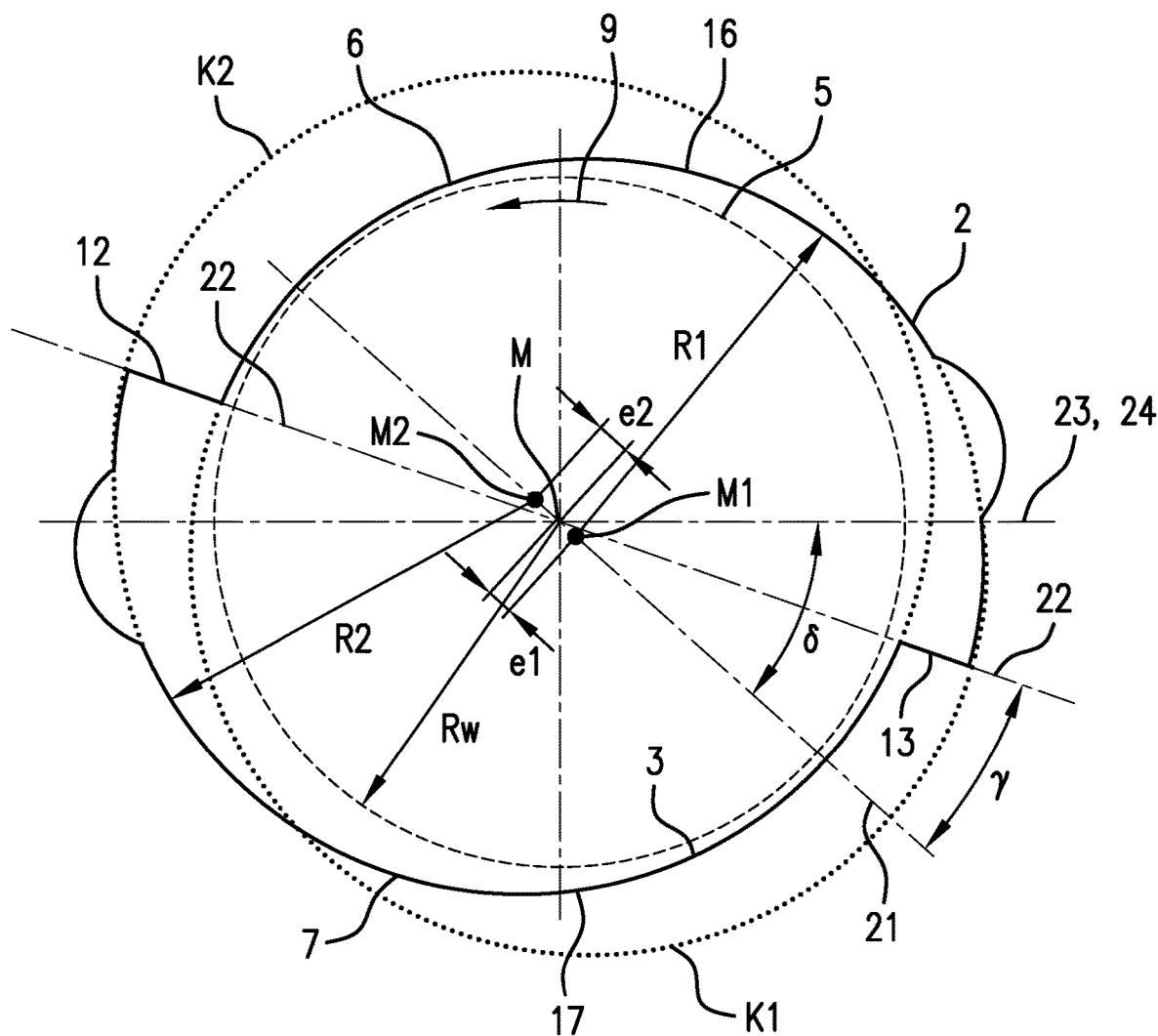
FIG. 2 is an illustration of an axial section of the inside contour of the exemplary hydrodynamic sliding bearing in FIG. 1, also with features illustrated in an exaggerated manner.

As shown in FIG. 2—which schematically illustrates an axial section of the inside contour of the exemplary inventive hydrodynamic sliding bearing of FIG. 1—a circle K1, K2 can be inscribed respectively into the at least two surface sections 6, 7, which has a larger radius R1, R2 than radius Rw of rotating shaft 5. Center points M1, M2 of the two inscribable circles K1, K2 respectively have an eccentricity e1, e2 relative to center point M of bearing shell 2. In the exemplary embodiment of hydrodynamic sliding bearing 1, eccentricity e2 of load segment 17 is greater than eccentricity e1 of non-load segment 16.

Center points M1, M2 of circles K1, K2 which can be inscribed into the at least two surface sections 6, 7 are arranged in an offset plane 21 progressing through center point M of bearing shell 2. Respective eccentricity e1, e2 corresponds to the distance of center point M1, M2 of the inscribed circle K1, K2 from center point M of bearing shell 2 in offset plane 21. The two offsets 12, 13 of the exemplary hydrodynamic sliding bearing 1 are arranged diametrically opposite each other in an offset point plane 22 which also extends through center M of bearing shell 2 and is inclined at an offset angle γ along bearing axis A relative to offset plane 21. The two offsets 12, 13 which are arranged between surface sections 6, 7 result from the different radii R1, R2 and the eccentricities e1, 12 of surface sections 6, 7. The two offsets 12, 13 are connecting surfaces "steps" arranged in offset point plane 22 between surface sections 6, 7.

Figure 3:
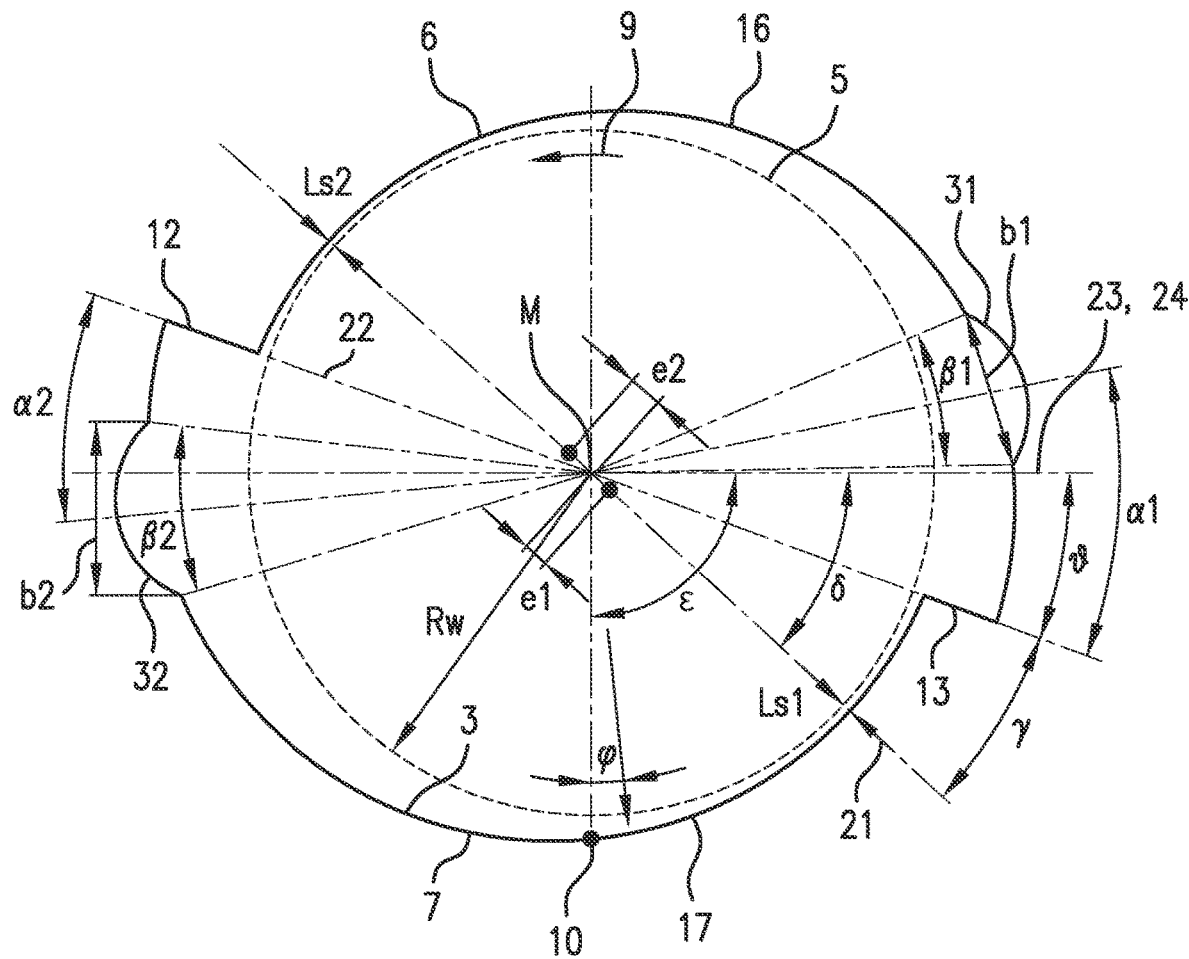
FIG. 3 is an illustration of the axial section of the inside contour from FIG. 2, showing additional details.

FIG. 3 provides an additional illustration of the axial section of the inner contour of exemplary inventive hydrodynamic sliding bearing 1 from FIG. 1. In contrast to the illustration in FIG. 2, FIG. 3 does not show the radii and centers of the circles that can be inscribed into surface sections 6, 7 for the sake of clarity.

Two oil supply pockets 31, 32 are shown on bearing surface 3, which in the sectional view represent bulges in the bearing surface 3. Oil supply pockets 31, 32 are each arranged at a pocket angle α1, α2 in the direction of rotation 9 of shaft 5 after an offset 12, 13, wherein pocket angle α1, α2 in the exemplary embodiment relates to the respective center of oil supply pocket 31, 32. As can be seen in FIG. 3, pocket angle α1 of oil supply pocket 31 is therein larger than pocket position angle α2 of oil supply pocket 32.

The opening of oil supply pockets 31, 32 along bearing surface 3 is described by opening angles β1, β2. Opening angle β2 of oil supply pocket 32 is herein larger than opening angle β1 of oil supply pocket 31.

Exemplary hydrodynamic sliding bearing 1 moreover has a virtual parting line plane 23 which is arranged pivoted at a parting angle θ relative to offset point plane 22. In the exemplary embodiment, parting angle θ is 20°. Hydrodynamic sliding bearing 1 also has a plane of separation 24 which is arranged pivoted at a separation angle δ relative to plane of offset 21. Sliding bearing 1 is split at plane of separation 24 to allow installation of shaft 5. In the illustrated exemplary embodiment, plane of separation 24 corresponds with virtual parting line plane 23.

Shell center 10 of bearing shell 2 of hydrodynamic sliding bearing 1 is arranged at a central angle c relative to virtual parting plane 23 which, in the exemplary embodiment is 90°. The exemplary design of hydrodynamic sliding bearing 1 described in the drawings is intended for a standard load angle φ shown in FIG. 3, in which the main load acts at the intended bearing load. Standard load angle φ in this design form is approximately 8° in relation to shell center 10 in the direction of rotation 9 of the shaft 5.

The two surface sections 6, 7 of hydrodynamic sliding bearing 1 moreover exhibit different profiling ψv, which is defined by the sum of eccentricities e1, e2 of surface sections 6, 7 and the radial bearing clearance Ls1 or Ls2, relative to the radial bearing clearance Ls1 or Ls2. Profiling ψv of load segment 17 is thereby greater than the profiling of non-load segment 16. Profiling ψv of load segment 17 and non-load segment 16 is in a range of 1 to 3, that of load segment 17 is in a range of 1.5 to 1.8 and profiling ψv of the non-load segment 16 is in a range of 1.2 to 1.5.

Figure 4:
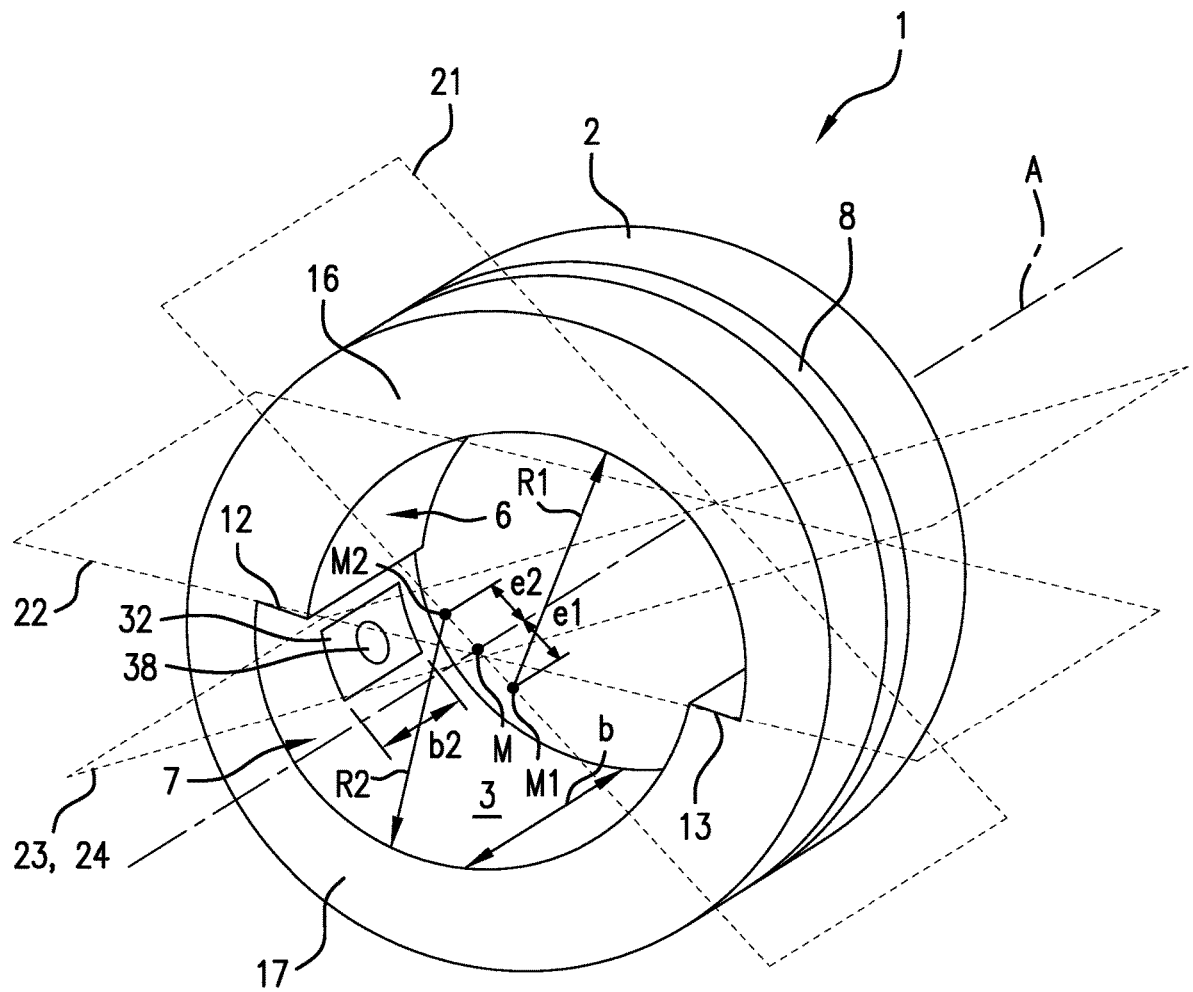
FIG. 4 is a three-dimensional illustration of an exemplary inventive hydrodynamic sliding bearing from FIG. 1, wherein the details described in FIG. 2 and FIG. 3 are shown.

FIG. 4 is again the three-dimensional illustration of exemplary hydrodynamic sliding bearing 1 from FIG. 1, whereby the characteristics and details discussed in FIG. 2 and FIG. 3 are also added.

In order to have oil available at the locations where it is required, the ratio of width b2 of oil supply pocket 32 at load segment 17 relative to width b of the bearing is in the range of 0.6 to 0.7, respectively; the ratio of the width of oil supply pocket 31 on non-load segment 16 to the width of the bearing is in the range of 0.35 to 0.5, respectively.

Figure 5:
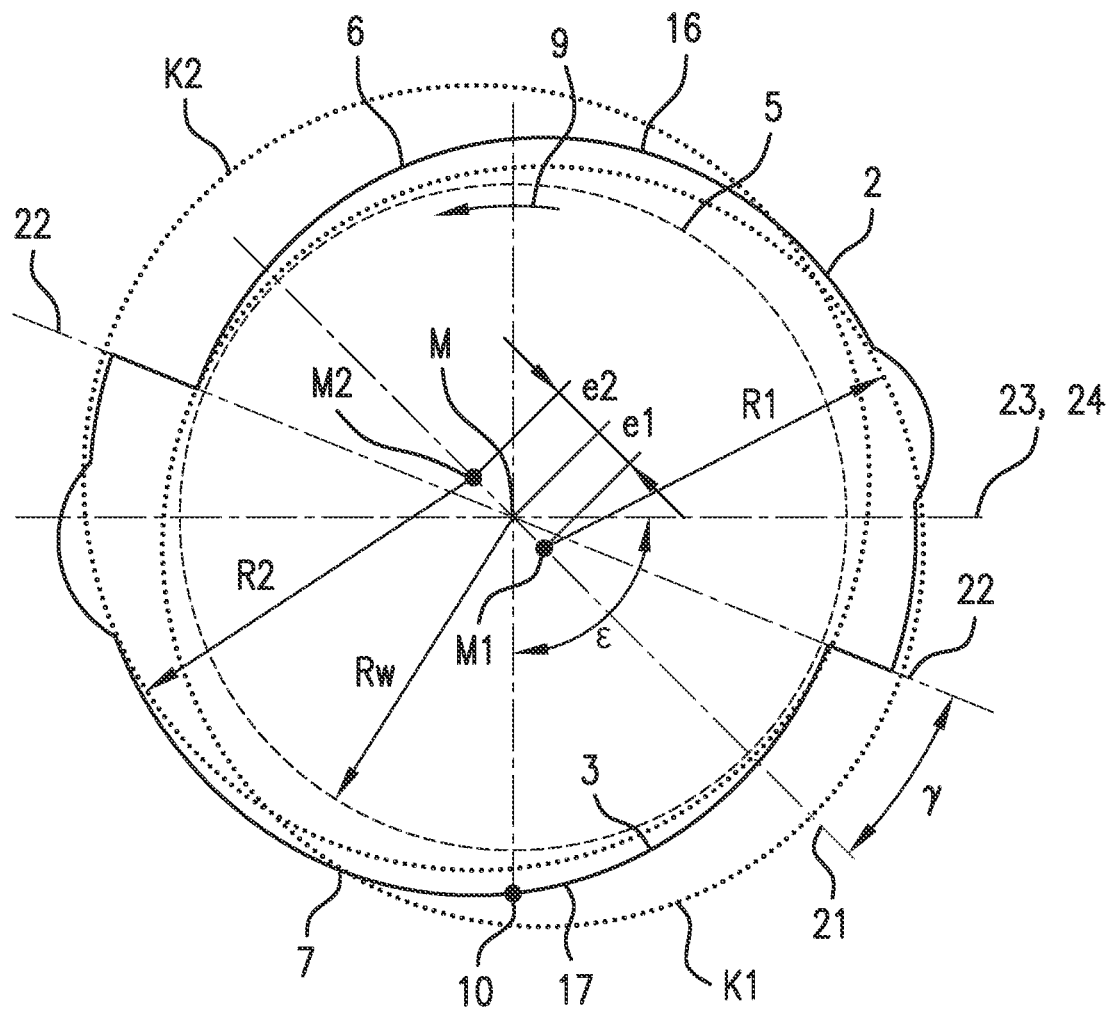
FIG. 5 is an illustration of an axial section of the inside contour of an additional embodiment of an inventive exemplary hydrodynamic sliding bearing, also with features illustrated in an exaggerated manner.

FIG. 5 is another illustration of an axial section of the inner contour of an additional embodiment of an exemplary inventive hydrodynamic sliding bearing 1. The specific features of the proposed sliding bearing are depicted in an exaggerated manner also in this drawing for the purpose of providing a better overview. The embodiment in FIG. 5 differs from the embodiment of the hydrodynamic sliding bearing 1 illustrated in FIGS. 1 to 4 in that, the geometry of the two surface sections 6, 7 is not circular, but is instead parabolic. As can be seen in conjunction with FIG. 5, a circle K1, K2 respectively can be inscribed into surface sections 6, 7 in the illustrated axial section, which as a larger radius R1, R2 than radius Rw of rotating shaft 5. Moreover, center points M1, M2 of the two circles K1, K2 inscribed into the parabolic arcs, respectively have an eccentricity e1, e2 relative to center point M of the bearing shell. In this example too, eccentricity e2 of load segment 17 is greater than eccentricity e1 of non-load segment 16.

COMPONENT IDENTIFICATION LISTING 1 hydrodynamic sliding bearing
2 bearing shell
3 bearing surface
5 shaft
6 surface section
7 surface section
8 oil supply groove
9 direction of rotation of shaft
10 shell center
12 offset
13 offset
16 non-load segment
17 load segment
21 plane of offset
22 offset point plane
23 virtual parting line plane
24 plane of separation
31 oil supply pocket
32 oil supply pocket
38 oil bore
A bearing axis
K1, K2 inscribable circles
R1, R2 radius of inscribed circles Rw radius of rotating shaft
M center point of bearing shell
M1, M2 center point of inscribed circles
Ls1, Ls2 radial bearing clearance
b bearing width
b1, b2 width of oil supply pocket
e1, e2 eccentricity
α1, α2 pocket position angle
β1, β2 opening angle of oil supply pocket
γ offset angle
δ separating angle
θ parting line angle
φ standard load angle
ε center angle
ψv profiling While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic sliding bearing, comprising:
a housing shell including an inner surface which forms a bearing surface configured for a rotating shaft having a radius, the housing shell including a center point, the bearing surface including at least two surface sections which are arranged one behind the other in a circumferential direction of the bearing shell, the at least two surface sections including at least one first surface section and at least one second surface section, the at least one second surface section forming a load segment, the at least one first surface section forming a non-load segment, the at least two surface sections each configured for being inscribed thereinto in an axial section with a respective circle, the respective circle of each of the at least two surface sections each having a radius that is larger than the radius of the rotating shaft and each having a center point each of which exhibits a respective eccentricity relative to the center point of the housing shell, the eccentricity of the load segment being greater than the eccentricity of the non-load segment, wherein a difference between the eccentricity of the load segment and the eccentricity of the non-load segment relative to the eccentricity of the load segment is between 10% and 70%.

2. The hydrodynamic sliding bearing according to claim 1, wherein the center point of each said circle is arranged in an offset plane progressing through the center point of the housing shell, the respective eccentricity corresponding to a distance of the respective center point of the respective circle from the center point of the housing shell in the offset plane.

3. The hydrodynamic sliding bearing according to claim 1, wherein the at least two surface sections adjoin at least one offset that is arranged between the at least two surface sections.

4. The hydrodynamic sliding bearing according to claim 3, wherein at least one oil supply pocket is arranged at the bearing surface at at least one pocket angle in a direction of rotation of the rotating shaft after the at least one offset, wherein the at least one pocket angle is between 0° and 40°.

5. The hydrodynamic sliding bearing according to claim 4, wherein the at least one oil supply pocket includes a first oil supply pocket and a second oil supply pocket, the at least one pocket angle including a first pocket angle and a second pocket angle, the at least one offset including a first offset and a second offset, the first pocket angle at which the first oil supply pocket is arranged in the direction of rotation of the rotating shaft after a first offset being independent of the second pocket angle at which the second oil supply pocket is arranged in the direction of rotation of the rotating shaft after the second offset.

6. The hydrodynamic sliding bearing according to claim 4, wherein the at least one oil supply pocket includes a first oil supply pocket and a second oil supply pocket, the at least one pocket angle including a first pocket angle and a second pocket angle, the at least one offset including a first offset and a second offset, the second oil supply pocket being arranged on the load segment and being arranged at the second pocket angle in the direction of rotation of the rotating shaft after the second offset, the second pocket angle being between 20° and 30°, and the first oil supply pocket being arranged on the non-load segment and being arranged at the first pocket angle that is in a range of 30° to 35°.

7. The hydrodynamic sliding bearing according to claim 4, further including at least one oil bore including a first bore and a second oil bore, wherein the at least one oil supply pocket includes a first oil supply pocket and a second oil supply pocket, the at least one pocket angle including a first pocket angle and a second pocket angle, the at least one offset including a first offset and a second offset, each of the first oil supply pocket and the second oil supply pocket being connected with a respective one of the first oil bore and the second oil bore for supplying the sliding bearing with oil.

8. The hydrodynamic sliding bearing according to claim 4, wherein the at least one oil supply pocket includes a first oil supply pocket and a second oil supply pocket, a first opening angle which describes an opening of the first oil supply pocket along the bearing surface being independent from a second opening angle which describes an opening of the second oil supply pocket along the bearing surface, wherein the first opening angle and the second opening angle is between 10° and 30°.

9. The hydrodynamic sliding bearing according to claim 8, wherein the first opening angle and the second opening angle is between 12° and 22°.

10. The hydrodynamic sliding bearing according to claim 4, wherein the at least one oil supply pocket includes a first oil supply pocket and a second oil supply pocket, a width of the first oil supply pocket on the bearing surface is independent of a width of the second oil supply pocket on the bearing surface.

11. The hydrodynamic sliding bearing according to claim 10, wherein a ratio of the width of the second oil supply pocket on the load segment to a width of the hydrodynamic sliding bearing is in a range of 0.6 to 0.7, respectively, wherein a ratio of the width of the first oil supply pocket on the non-load segment to the width of the hydrodynamic bearing is in a range of 0.35 to 0.5, respectively.

12. The hydrodynamic sliding bearing according to claim 3, wherein the at least one offset is two offsets that are arranged between the at least two surface sections, diametrically opposite to one another in an offset point plane progressing through the center point of the housing shell, wherein the offset point plane is arranged at an offset angle relative to an offset plane progressing through the center point of the housing shell, wherein the offset angle is between 0° and 40°.

13. The hydrodynamic sliding bearing according to claim 12, wherein the offset angle is between 15° and 25°.

14. The hydrodynamic sliding bearing according to claim 12, wherein a virtual parting line plane is arranged pivoted at a parting angle relative to the offset point plane, wherein the parting angle is 20°.

15. The hydrodynamic sliding bearing according to claim 14, wherein a center line of the housing shell is arranged at a central angle in relation to the virtual parting line plane, which is 90°.

16. The hydrodynamic sliding bearing according to claim 15, wherein the hydrodynamic sliding bearing is configured for a standard load angle of between −10° and 25°, in a direction of rotation of the rotating shaft relative to the center of the housing shell.

17. The hydrodynamic sliding bearing according to claim 14, wherein the housing shell has two bearing shell halves, each of which extends over 180° of the bearing surface and are joined at a separating line in a plane of separation.

18. The hydrodynamic sliding bearing according to claim 17, wherein the plane of separation is pivoted at a separating angle with respect to an offset plane progressing through the center point of the housing shell, the separating angle being between 10° and 80°.

19. The hydrodynamic sliding bearing according to claim 18, wherein the separating angle is between 35° and 45°.

20. The hydrodynamic sliding bearing according to claim 17, wherein the plane of separation corresponds to the virtual parting line plane.

21. The hydrodynamic sliding bearing according to claim 1, wherein a geometry of at least one of the at least two surface sections is described as a mathematical function.

22. The hydrodynamic sliding bearing according to claim 21, wherein the geometry of at least one of the at least two surface sections is one of a circular arc, an elliptical arc, a hyperbolic arc, a parabolic arc, and a curve segment with a mathematical order of two or higher.

23. The hydrodynamic sliding bearing according to claim 1, wherein the at least two surface sections have a profiling which is different relative to one another, wherein the profiling is defined by a sum of the respective eccentricity of a respective one of the at least two surface sections and a radial bearing clearance with regard to the radial bearing clearance.

24. The hydrodynamic sliding bearing according to claim 23, wherein the profiling of the load segment is larger than the profiling of the non-load segment.

25. The hydrodynamic sliding bearing according to claim 23, wherein the profiling of the load segment as well as the profiling of the non-load segment is in a range of 1 to 3.

26. The hydrodynamic sliding bearing according to claim 23, wherein the profiling of the load segment is in a range of 1.5 to 1.8.

27. The hydrodynamic sliding bearing according to claim 23, wherein the profiling of the non-load segment is in a range of 1.2 to 1.5.

* * * * *